March 11, 1924.

L. COLLETTE 1,486,730

ANTISKID AND GRIP DEVICE FOR MOTOR DRIVEN VEHICLES

Filed Nov. 1, 1921

Inventor
Louis Collette,
By Ethune Talbert
Attorney

March 11, 1924.

L. COLLETTE 1,486,730

ANTISKID AND GRIP DEVICE FOR MOTOR DRIVEN VEHICLES

Filed Nov. 1, 1921

Inventor
Louis Collette,

By

Attorney

Patented Mar. 11, 1924.

1,486,730

UNITED STATES PATENT OFFICE.

LOUIS COLLETTE, OF SPENCER, MASSACHUSETTS.

ANTISKID AND GRIP DEVICE FOR MOTOR-DRIVEN VEHICLES.

Application filed November 1, 1921. Serial No. 512,090.

*To all whom it may concern:*

Be it known that LOUIS COLLETTE, a citizen of the United States of America, residing at Spencer, in the county of Worcester and State of Massachusetts, has invented new and useful Improvements in Antiskid and Grip Devices for Motor-Driven Vehicles, of which the following is a specification.

The object of the invention is to provide as an attachment for motor driven vehicles including automobiles, trucks and the like a means for preventing lateral or rearward skidding or sliding either when the vehicle is in motion or at rest as upon a grade; and more particularly to provide a device for this general purpose which while being adapted to be carried by the vehicle in readiness for use in an emergency, it may be controlled in its operation by the driver of the car so as to be put into commission only when required; and otherwise may not interfere with or modify in any respect the usual operation of the vehicle; and with these objects in view the invention consists in a construction and combination of parts of which a preferred embodiment is shown in the accompanying drawings, wherein:—

Figure 1:
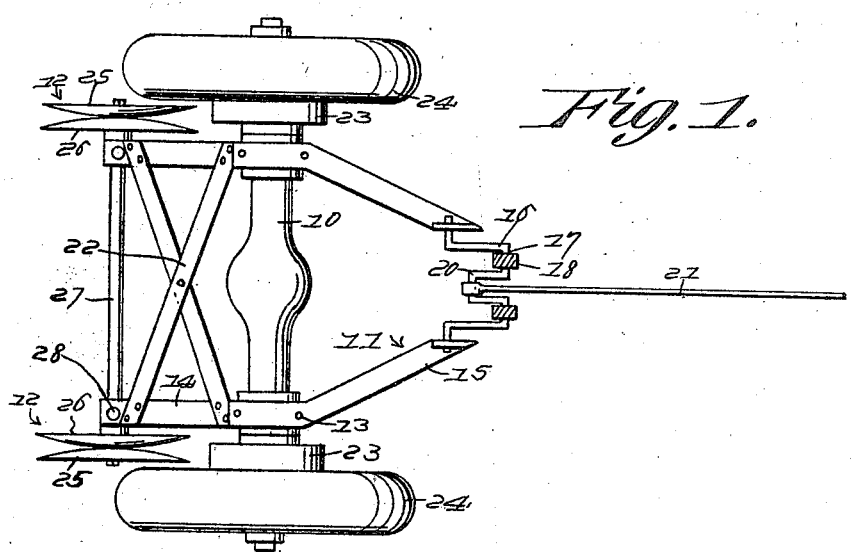
Figure 1 is a plan view of an anti-skid attachment embodying the invention applied in the operative position to the rear axle of a car, the device here shown being particularly adapted for automobiles.
Figure 2:
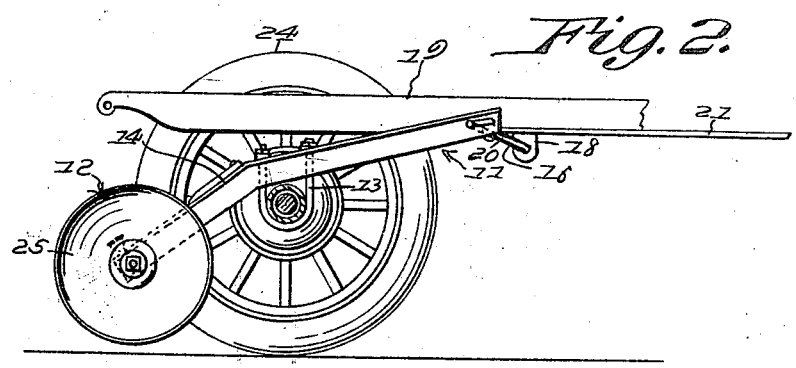
Figure 2 is a side view of the construction illustrated in Figure 1.

The apparatus which is designed to be carried by the chassis of a motor driven vehicle, and especially by the rear axle thereof as shown at 10 in Figures 1 and 2, consists essentially of a rocking or tilting frame 11 carrying shoes 12 for contact with the surface of the roadway or street and means for effecting the tilting movement of said frame to bring the shoes into contact or operative relation with the road surface.

In the illustrated embodiment of the invention the frame is mounted upon the axle by means of clips 13 and consists of side bars 14 of which the forward ends are preferably convergently arranged to constitute arms 15 of which the extremities may be connected with the terminal arms 16 of a crank shaft 17 mounted in suitable bearings in the member 18 depending from the car frame 19, the intermediate crank 20 of said shaft having connected therewith an operating rod 21 which may extend to any suitable operating hand or foot lever (not shown) located within the convenient reach of the driver of the car. The particular construction of the operating means is not essential to the present invention and may be modified both as to form and location to suit the peculiarities of the car or vehicle or the preferences of the builder or operator. Similarly the operating means consisting in the construction illustrated of the crank shaft may be modified to adapt it to the type of car in connection with which the device may be used.

The side bars of the tilting frame are shown in the drawing as being reinforced by the intersecting braces 22 to afford the necessary rigidity, the side bars being mounted upon the rear axle between the planes of the brake drums 23 of the ordinary construction so as to locate the shoes 12 between the planes of the driving wheels 24 and respectively adjacent to the inner sides thereof, so that when the frame is tilted to bring the shoes into engagement with the road surface they are located adjacent to the tread portions of the drive wheels or those portions of the said wheels which are in contact with the roadway or surface.

The form of shoe illustrated in Figures 1 and 2 and which is particularly adapted for use in connection with automobiles and similar rapidly driven vehicles embodies a plurality of oppositely facing concavo-convex disks 25 and 26 having their centers arranged in contact and secured together and to a transverse spindle 27 which is mounted in bearings 28 at the rear ends of the side bars 14 so as to be free to rotate.

When the frame is tilted by the operation of the rod 21 to bring the peripheries of the shoes into engagement with the road surface they operate in both directions to prevent lateral skidding or sliding movement, the arches or convexities of both sets of disks being opposed so as to afford the maximum resistance and produce a cutting action which while not interfering with the forward progress of the car will cause the drive wheels to remain in the path defined by the position thereof. Obviously the device may be brought into operation in rounding curves or making sharp turns or whenever on slippery surfaces there may be a tendency to skid or depart from the prescribed line of progress.

Figure 3:
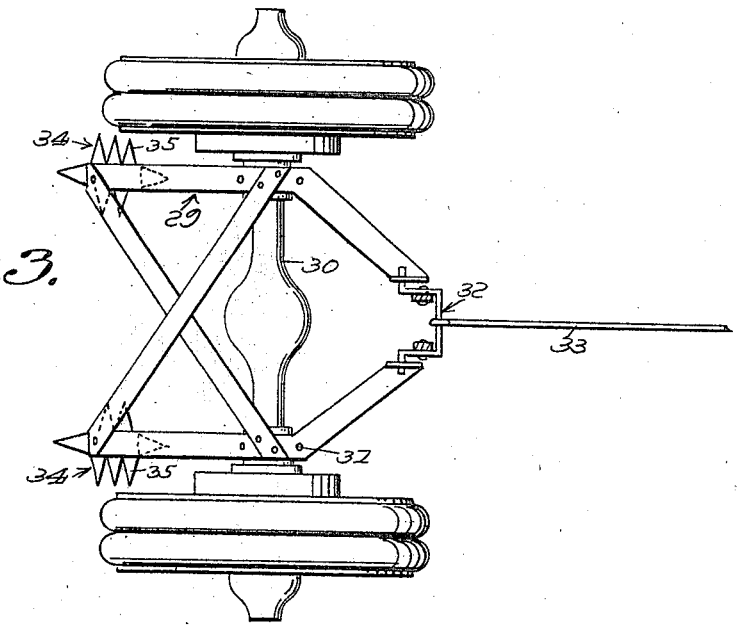
Figures 3 and 4 are respectively plan and side views of a modified form of the device particularly adapted for use in connection with trucks.
Figure 4:
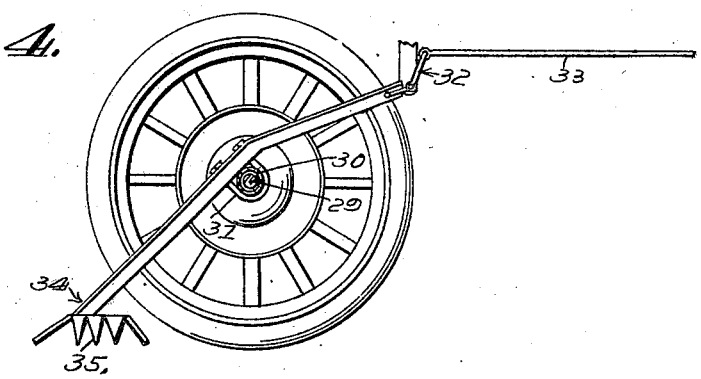

In the modification illustrated in Figures 3 and 4 and designed particularly for use in connection with trucks, heavy or relatively slow moving vehicles, the construction of the tilting frame 29 corresponds substantially with that hereinabove described, and the mounting thereof upon the rear axle 30, by means of clips 31 or the equivalents thereof may also correspond with that above described, and similarly the operating means indicated at 32 may consist of a crank shaft with which is connected an operating rod 33. The form of shoe 34 employed in this connection, however, preferably embodies a plate having downwardly directed and divergent spurs 35 reduced to points and adapted to engage the road surface, so as not only to have the effect of preventing lateral skidding movement in making turns or rounding curves, but to positively engage the road surface when desired, to prevent either backward or forward movement of the vehicles when brought to rest on a grade, when the engine is stopped. In other words in connection with trucks and like heavy vehicles the anti-skid device is adapted also to perform the function of a brake which when brought into operation permanently and firmly anchors the car against movement in any direction. Obviously such an apparatus is of particular advantage in connection with trucks which are being operated on slippery pavements and where the locking of the ordinary brake mechanism is insufficient to hold the car stationary or prevent forward or backward sliding movement.

Having described the invention, what is claimed as new and useful is:—

A device for the purpose indicated comprising a rocking or tilting frame provided with side bars having clips for effecting a pivotal connection between them and the rear axle of a vehicle, shoes carried by the frame at the rear end of the latter for contact with the surface of a roadway or street, the side bars beyond the clips being arranged on converging lines, a crank shaft mounted for rocking movement and provided with terminal arms pivotally connected with the extremities of the side bars of the frame and having an intermediate crank, and a longitudinally movable operating rod terminally connected with said intermediate crank for rocking the crank shaft and thereby tilting the frame.

In testimony whereof he affixes his signature.

LOUIS X COLLETTE.
his mark

Per:
OLIER L. BARIL.